United States Patent [19]
Buchanan et al.

[11] Patent Number: 5,549,274
[45] Date of Patent: Aug. 27, 1996

[54] BALL GUIDE FOR AN ELECTRONICALLY ACTUATED CONTROL VALVE

[75] Inventors: David L. Buchanan, Westport; Donald J. Benson, Columbus, both of Ind.

[73] Assignee: Cummins Engine Company, Inc., Columbus, Ind.

[21] Appl. No.: 230,250

[22] Filed: Apr. 20, 1994

[51] Int. Cl.$^6$ .................................................. F16K 31/06
[52] U.S. Cl. ....................... 251/129.14; 251/360
[58] Field of Search .......................... 251/129.15, 901, 251/129.01, 318, 319, 359, 360, 363, 361, 129.14; 335/280, 262; 239/585.1, 585.2, 585.3

[56] References Cited

U.S. PATENT DOCUMENTS

| | | |
|---|---|---|
| 315,273 | 4/1885 | Gilbert . |
| 1,839,730 | 1/1932 | Baten et al. . |
| 1,908,440 | 5/1933 | Milton . |
| 2,822,818 | 2/1958 | Breznick ......................... 251/129.14 X |
| 2,828,936 | 4/1958 | Hales ................................... 251/361 X |
| 4,018,419 | 4/1977 | Monpetit . |
| 4,286,626 | 9/1981 | Leiber ............................ 251/129.15 X |
| 4,394,962 | 7/1983 | Wilber . |
| 4,549,715 | 10/1985 | Engel . |
| 4,705,210 | 11/1987 | Graser et al. ......................... 239/585.3 |
| 4,767,097 | 8/1988 | Everett et al. ................. 251/129.14 X |
| 4,981,282 | 1/1991 | Krauss ............................ 251/129.15 X |
| 5,060,868 | 10/1991 | Knapp et al. ......................... 239/585.3 |
| 5,143,345 | 9/1992 | Miki et al. ...................... 251/129.14 X |

*Primary Examiner*—Kevin Lee
*Attorney, Agent, or Firm*—Sixbey, Friedman, Leedom & Ferguson; Charles M. Leedom, Jr.

[57] ABSTRACT

A valve for selectively permitting the flow of fluid therethrough is disclosed including a housing having at least one inlet and at least one outlet, a valve seat provided in the housing about the inlet, a displaceable ball for cooperating with the valve seat for sealing fluidic communication between the inlet and outlet and a ball guide for guiding the ball between a closed position in contact with the valve seat and an open position spaced from the valve seat. The ball guide includes a central bore for reciprocally receiving the ball and a plurality of circumferentially spaced fluid passages in fluid communication with the inlet, the passages extending substantially parallel to a longitudinal extent of the central bore such that a flow of fluid through the inlet is directed radially outwardly from the central bore and into the circumferentially spaced passages when the ball is in the open position. Fluid flow through the valve seat is thus restricted to flow through a sharp right angle bend allowing more fluid momentum to be used to hold the ball in a stable position. Accordingly, a majority of the flow is directed underneath the ball and only a small amount of flow goes through the clearance between the ball and the central bore of the ball guide, such that the ball is maintained in a stable condition thus resulting in more consistent flow metering.

8 Claims, 2 Drawing Sheets

5,549,274

BALL GUIDE FOR AN ELECTRONICALLY ACTUATED CONTROL VALVE

TECHNICAL FIELD

The present invention relates to a guide mechanism for guiding a ball in a control valve, and more particularly to a ball guide for guiding a ball in an electronically actuated control valve to minimize unstable conditions which can result in inconsistent flow metering.

BACKGROUND ART

Electronically controlled fuel injectors for internal combustion engines have enjoyed widespread acceptance in that they significantly improved fuel efficiency and pollution abutment. A major factor tending to impede wider use has been the complexity and high cost of commercially available units. Only when major compromises in performance are tolerable have simplification and cost reduction been possible.

A simplified design for an electronically controlled fuel injector has been disclosed in U.S. Pat. No. 4,235,374 to Walter et al. by which fuel injection may be both timed and metered electronically on a cycle-by-cycle basis using only a single electrically controlled valve. The '374 injector is characterized by a very simple mechanical structure including a cam operated primary pumping plunger and a secondary plunger hydraulically linked to the primary pumping plunger at selected times during the reciprocating motion of the primary pumping plunger. A single electronically controlled valve operates, upon closing, to form the hydraulic link and, upon opening, to break the hydraulic link by allowing liquid to flow freely into and out of the hydraulic link forming chamber. While quite simple in concept, extremely severe operating requirements are imposed on the electrically controlled valve since it must be capable of sealing back pressures in excess of 25,000 psi during injection periods and must be capable of accommodating sufficient flow volumes to allow the hydraulic link to be adjusted selectively on a cycle-by-cycle basis to produce the desired metering and timing functions. Moreover, a satisfactory valve must also be capable of moving between a fully closed position and a fully open position in less than 1 millisecond and must be relatively inexpensive to manufacture and fail safe in operation. Further, such a valve has been susceptible to unstable flow conditions which result in inconsistent flow metering.

Previously known valve designs have attempted to overcome such disadvantageous characteristics, however none have been capable of meeting all of the above desired characteristics. For example, magnetically operated valves such as illustrated in U.S. Pat. No. 3,368,791 include a spool type valve plunger requiring expensive, high-tolerance machining operations and a relatively high inertia plunger and operator which would make the necessary speed of operation and flow handling capability difficult if not impossible to achieve. Lower cost ball-type valves (such as illustrated in U.S. Pat. Nos. 2,229,499; 2,792,195 and 3,464,668) are known but such valves also fail to provide high speed operation and satisfactory flow capacity while at the same time providing the necessary back flow sealing ability. For example, U.S. Pat. No. 2,792,195 to Mosbacher discloses a solenoid operated valve including a ball type valve element spring biased toward a closed position and moved to an open position by a spring biased valve operator which can only be rendered inoperative, thereby allowing the valve to close, when the operator is retracted against spring pressure by an electronically energized coil. While useful for the purposes intended, a Mosbacher type valve could not satisfy the operating criteria listed above because the valve operator relies on momentum build up rather than primarily spring force to move the ball element to its open position. Further increase in the size of the valve operator to permit a larger size spring would merely increase the inertia of the operator and work against achievement of the desired high speed operation. Reliance on the momentum imparted to the operator to open the ball valve also requires a significant gap between the valve operator and the valve to allow momentum build up upon de-energization of the coil. Such a large gap also works against high speed operation. Attempts to reduce this gap by increased spring force not only presents the inertia problem discussed above, but also introduces manufacturing tolerances which presents the possibility of improper valve closure. Still another problem is that a Mosbacher-type valve could probably not resist back pressures in excess of 1,500 psi and certainly could not resist back pressures in excess of 25,000 psi because of the use of O rings to seal the valve seat element.

Further, a valve of this type suffers from a phenomenon known as vortex shedding as fuel flows around the ball after it has been lifted off its valve seat. That is, with the flow of fluid past the ball, the shedding of fluid vortices periodically occurs downstream from the ball. These unstable conditions often cause high frequency oscillations or "buzzing" in the fuel line. Such unstable conditions further result in inconsistent flow metering which degrade fuel economy and pollution reduction. Further, the start of injection will be inconsistent resulting from inconsistent metering of fuel.

U.S. Pat. No. 4,018,419 issued to Monpetit discloses yet another solenoid actuated valve including a displaceable ball which when displaced from the ball seat permits the flow of fuel through the valve housing. When the coil is de-energized, the ball is displaced from the valve seat and fluid must flow about the contour of the ball. Again, as with the above noted valves, a valve of this type likewise is susceptible to unstable flow conditions such as vortex shedding as the flow goes around the ball after it has been displaced from the valve seat. As discussed hereinabove, such unstable conditions often cause high frequency oscillations in the fuel line resulting in variations in the start of injection do to inconsistent flow metering which degrade fuel economy and pollution control.

In yet another attempt to overcome the above noted shortcomings, U.S. Pat. No. 4,394,962 issued to Wilbur sets forth an electronically actuated control valve for controlling the flow of fuel to a fuel injector wherein a ball valve is incorporated for selectively permitting the flow of fuel to the injector. The ball valve is initially held in the closed position by means of a spring biasing force and the force of the fuel pressure. When desired, the solenoid is energized so as to extend a contact rod into contact with the ball in order to displace the ball from the valve C. In doing so, fuel is permitted to flow around the ball in order to control the flow of fuel to an injector. Once again, such a valve suffers from unstable fuel flow about the ball and thus results in an inconsistent metering of fuel flow to the injector and consequently variable starting of injection.

Clearly, there is a need for a fast acting solenoid operating valve for controlling the flow of fuel in an internal combustion engine fuel system which significantly reduces unstable flow conditions resulting in a more consistent metering of fuel to the injectors of the internal combustion engine and a reduction in injection start variations.

SUMMARY OF THE INVENTION

A primary object of the present invention is to overcome the above noted shortcomings associated with the prior art control valves.

A more particular object of the present invention is to provide a solenoid operated ball valve which provides a stable flow of fuel therethrough in order to accurately meter fuel directed to a fuel injector of an internal combustion engine.

Yet another object of the present invention is to provide a guide for guiding the ball of a solenoid operated ball valve so as to redirect the main flow path away from the sides of the ball thus minimizing unstable flow conditions.

Yet another object of the present invention is to provide a guide for guiding the ball of a solenoid operated ball valve so as to ensure proper seating of the ball when the solenoid is de-energized.

A further object of the present invention is to provide a solenoid operated ball valve which significantly reduces start of injection variations previously experienced with such valves.

An additional object of the present invention is to provide a solenoid operated ball valve wherein accurate and repeatable metering of fuel to the injector is obtained.

Yet another object of the present invention is to provide a solenoid operated ball valve wherein engine performance is enhanced by the reduction of cycle-to-cycle and shot-to-shot variations in fuel metering.

These as well as additional objects of the present invention are achieved by providing a valve for selectively permitting a flow of fluid therethrough including a housing having at least one inlet and at least one outlet, a valve seat provided in the housing about the inlet, a displaceable ball for cooperating with the valve seat for sealing fluidic communication between the inlet and outlet and a ball guide for guiding the ball between a closed position in contact with the valve seat and an open position spaced from the valve seat. The ball guide including a central bore for reciprocally receiving the ball and a plurality of circumferentially spaced fluid passages in fluid communication with the inlet, the passages extending substantially parallel to a longitudinal extent of the central bore such that a flow of fluid through the inlet is directed radially outward from the central bore and into the circumferentially spaced passages when the ball is in the open position. Fluid flow through the valve seat is restricted to flow through a sharp right angle bend allowing more fluid momentum to be used to hold the ball in a stable position. Accordingly, a majority of the flow is directed underneath the ball and only a small amount of flow passes through the clearance between the ball and the central bore of the ball guide. In doing so, the ball is maintained in a stable condition thus resulting in more consistent flow metering and a reduction in vortex shedding experienced with previous valve designs.

These as well as additional advantages of the present invention will become apparent from the following detailed description when read in light of the several figures.

DETAILED DESCRIPTION OF THE PREFERRED EMBODIMENT

Referring to the several figures and particularly FIG. 1, the preferred embodiment of the present invention will now be set forth in greater detail hereinbelow.

Figure 1:
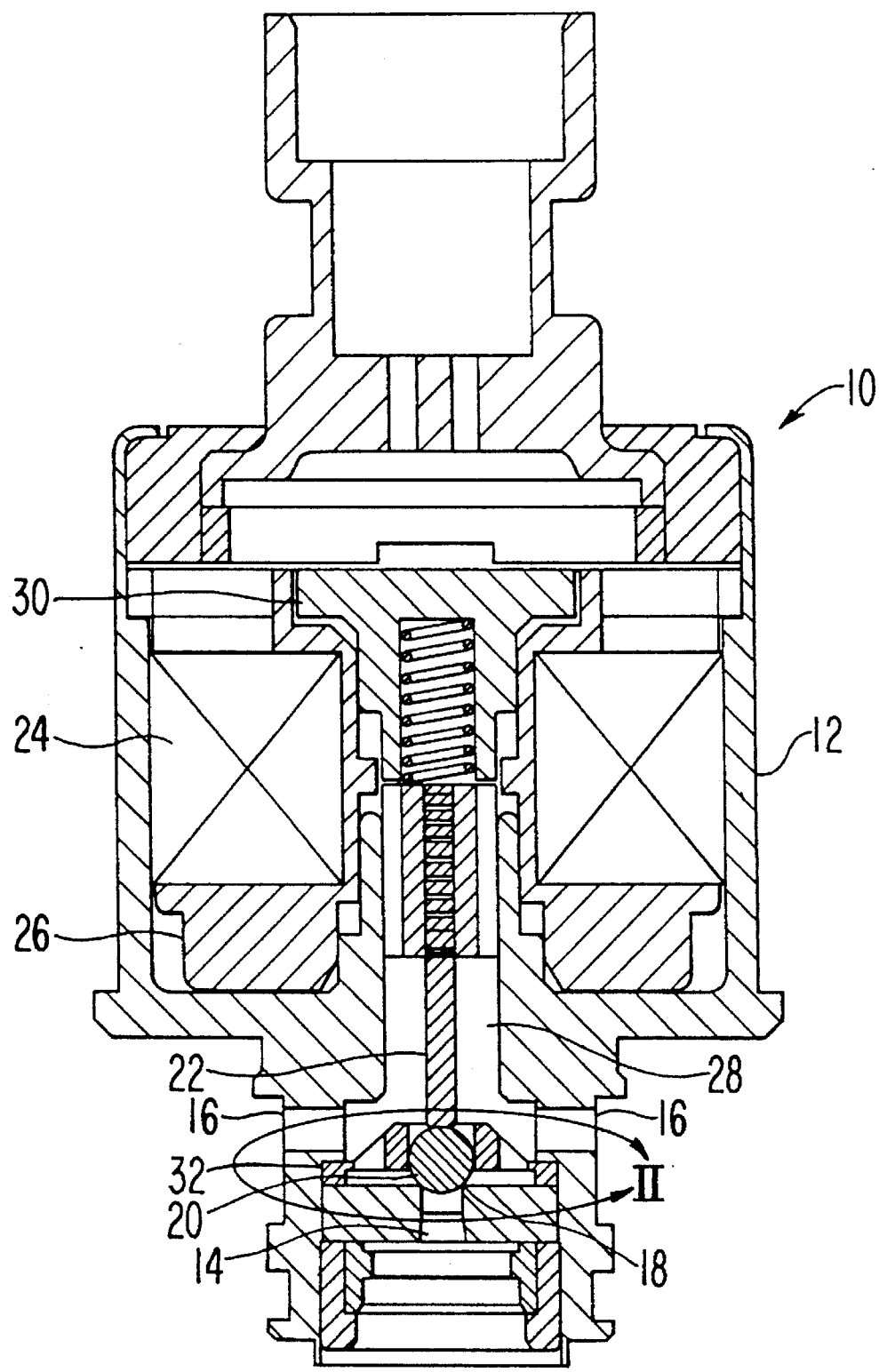
FIG. 1 is a cross sectional view of a solenoid actuated control valve incorporating the ball guide in accordance with the present invention for controlling the flow of fuel therethrough.

The solenoid actuated control valve 10 illustrated in FIG. 1 includes a housing 12 which houses the components of the solenoid actuated control valve 10. The housing 12 includes an axially extending inlet 14 and radially extending outlets 16 with a valve seat 18 positioned therebetween. When the valve is in the closed position as illustrated in FIG. 1, a ball 20 is seated in contact with the valve seat 18 thus closing off fluidic communication between the inlet 14 and the outlet 16.

Movement of the ball 20 is controlled by a solenoid actuated mechanism which includes an armature pin 22 which contacts the ball 20 forcing the ball into a closed position when the solenoid is de-energized. The solenoid itself includes a coil 24 which is housed within a support structure 26 and which encircles a central bore 28 formed in the housing. Attached to the actuator pin in a conventional manner is an armature 30 which is manipulated by energization and de-energization of the coil 24 in a known manner. The heretofore described structure is essentially that presently manufactured by Fasco Controls Corporation.

As can be seen from the encircled area II, the ball 20 is positioned within a ball guide 32 which guides the movement of the ball between the open and closed positions. This ball guide will be explained in greater detail with reference to FIGS. 2 and 3.

Figure 2:
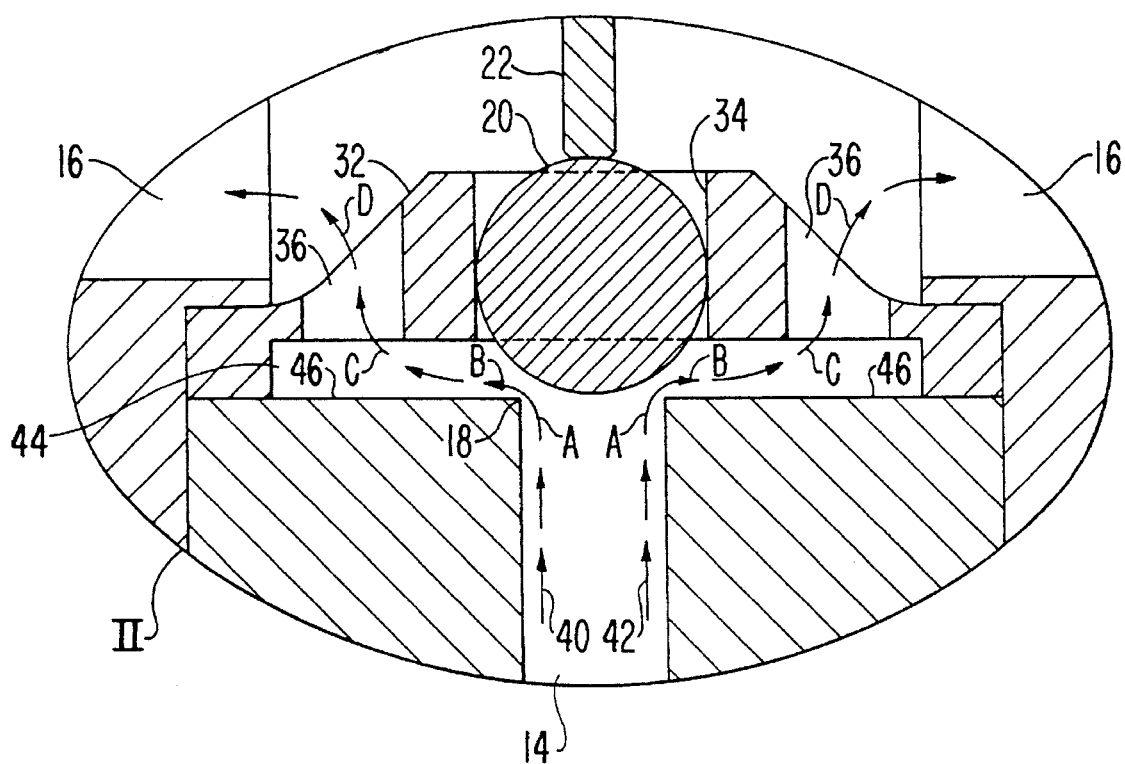
FIG. 2 is an expanded view of the encircled area II of FIG. 1.
Figure 3:
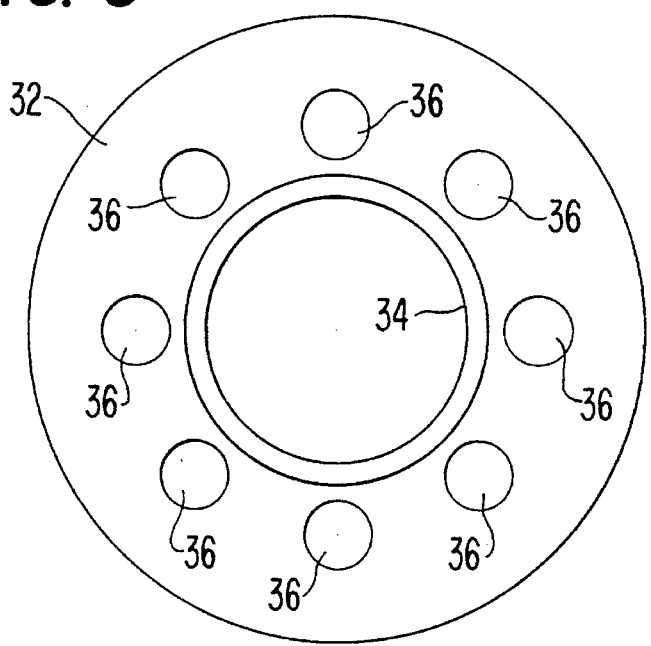
FIG. 3 is a top view of the ball guide in accordance with the present invention.

As can be seen frown FIG. 2, the ball guide 32 includes a central bore 34 which reciprocally receives the ball 20. The diameter of the central bore 34 is only slightly larger than the diameter of the ball 20 such that the radial clearance between the ball and the guide is relatively small so as to accurately position the ball in the radial direction so as to properly seat the ball within the valve seat 18 when the valve is to be closed. The minimal clearance between the ball 20 and central bore 34 also restricts the flow of fluid through such region such that the main flow is directed radially outwardly. The ball guide further includes a plurality of circumferentially spaced axially extending bores 36 which are positioned about the central bore 34. These axially extending bores 36 extend substantially parallel to and radially offset from the inlet 14. The axially extending bores 36 permit the flow of fluid from the inlet 14 to the outlet 16 when the ball 20 is displaced by the electronically controlled solenoid valve. While FIG. 3 illustrates a substantially diametrically opposed axial bores 36, the particular number and size of the axial bores is to be determined on a case by case basis depending upon the desired amount of fluid flow through the valve.

The main flow path of fluid through the ball guide follows along the paths illustrated by the broken arrowed lines 40 and 42 set forth in FIG. 2. The main flow path exits the inlet 14 at the valve seat 18 labelled as A, and is subsequently directed at substantially a right angle radially outward by the ball 20 through the annular area between the ball 20 and valve seat 18, this portion of the flow path being labelled B. The flow path then continues radially outwardly through an undercut region or central cavity 44 of the ball guide in between the ball guide 32 and the upper surface 46 of the valve seat 18. This portion of the main flow path being labelled C. The main flow path then proceeds through the axially extending bores 36 and exits to the outlet 16. This portion of the flow path being labelled D.

With the valve seat and ball guide design forth hereinabove, the main flow path through the ball guide is directed at a sharp right angle bend in the region between flow paths A and B allowing more fluid momentum to be used to hold the ball in a stable position. Further, most of the flow is directed underneath the ball and only a small amount of flow passes through the clearance between the ball 20 and the ball guide 32 in that the diameter of the central bore 35 is only minimally larger than the diameter of the ball 20 so as to allow for the reciprocal movement of the ball. In doing so, the ball is maintained in a stable condition thus preventing vortex shedding as fuel flows around the ball after it has been lifted off the valve seat 18. Accordingly, because the ball is maintained in a stable condition, the high frequency oscillations or "buzzing" in the fuel line experienced in prior art valves of this type is eliminated. Accordingly, consistent flow metering can be obtained thus resulting in an increase in fuel economy as well as a decrease in $NO_x$ emissions.

Accordingly, in view of the foregoing it is clear that by providing a ball guide in accordance with the above disclosure, unstable conditions in the metering of fluid from the inlet to the outlet in a electronically actuated solenoid valve can be minimized thereby resulting in more accurate metering of the flow through the valve and consequently more efficient operation of an internal combustion engine employing such valve. Additionally, engine performance is enhanced by the reduction of cycle-to-cycle and shot-to-shot variations in fuel metering such that accurate and repeatable metering of fuel is obtained. This results in consistent start of injections throughout the engine operating cycles.

While the present invention has been described with reference to a preferred embodiment, it will be appreciated by those skilled in the art that the invention may be practiced otherwise than as specifically described herein without departing from the spirit and scope of the invention. It is, therefore, to be understood that the spirit and scope of the invention be limited only by the appended claims.

INDUSTRIAL APPLICABILITY

The present invention may be employed in any ball and valve seat type valve wherein it is desired to minimize unstable flow of fluid through the valve. Moreover, the present invention is more particularly suited for use in a fuel system of an internal combustion engine where it is desired to accurately meter fuel to the injectors of such engine.

We claim:

1. A valve for selectively permitting a flow of fluid therethrough comprising;

a housing having an axially oriented inlet and at least one outlet;

a valve seat provided in said housing about said inlet;

a sealing means for cooperating with said valve seat for sealing fluidic communication between said axially oriented inlet and said outlet; and a sealing means guide for guiding said sealing means between a closed position in contact with said valve seat and an open position spaced from said valve seat;

said sealing means guide comprising;

a central bore for reciprocally receiving said sealing means;

a plurality of circumferentially spaced fluid passages in fluid communication with said axially oriented inlet, said passages extending substantially parallel to said axially oriented inlet; and fluid directing means for directing a flow of fluid passing through said axially oriented inlet away from said central bore and into said circumferentially spaced passages when said sealing means is in the open position.

2. A valve as defined in claim 1, further comprising a central cavity in fluid communication with the inlet, said central bore and said fluid passages.

3. The valve as defined in claim 1, wherein substantially no fluid passes through said central bore when said sealing means is displaced from said valve seat.

4. The valve as defined in claim 3, further comprising displacement means for displacing said sealing means from said valve seat for permitting fluid flow from said inlet through said fluid passages.

5. The valve as defined in claim 4, wherein said sealing means is a ball.

6. The valve as defined in claim 5, wherein a diameter of said ball is less than a diameter of said central bore.

7. The valve as defined in claim 5, wherein said displacement means is an electronically controlled solenoid actuator.

8. The valve as defined in claim 7, wherein said solenoid actuator includes an armature pin with said pin contacting said ball during movement of said ball between said closed position and said open position.

* * * * *